United States Patent

Grants

[15] 3,704,562
[45] Dec. 5, 1972

[54] PREFORMED ENCLOSED INSULATING FILLER AND INSULATING STRIP

[72] Inventor: Paul R. Grants, Roselle Park, N.J.

[73] Assignee: I. F. S. Incorporation

[22] Filed: Oct. 5, 1970

[21] Appl. No.: 78,095

[52] U.S. Cl. ..................................52/396, 52/405
[51] Int. Cl. ..............................................E04b 1/62
[58] Field of Search ................52/309, 404–406, 52/396

[56] References Cited

UNITED STATES PATENTS

| | | |
|---|---|---|
| 3,204,381 | 9/1965 | Perreton..........................52/504 X |
| 3,141,206 | 7/1964 | Stephens.........................52/406 X |
| 2,592,634 | 4/1952 | Wilson..............................52/405 X |
| 2,852,934 | 9/1958 | Amundson............................52/405 |
| 2,856,039 | 10/1958 | Hawkinson.......................52/407 X |
| 3,318,062 | 5/1967 | Grants..................................52/309 |

Primary Examiner—Alfred C. Perham
Attorney—Clarence A. O'Brien and Harvey B. Jacobson

[57] ABSTRACT

An insulating filler or insert for hollow building blocks which is preformed and enclosed with a covering material together with an insulating strip engaged with a portion of the periphery of the filler to provide a continuous insulating wall within a hollow wall formed by hollow building blocks.

1 Claim, 3 Drawing Figures

PATENTED DEC 5 1972 3,704,562

Paul R. Grants
INVENTOR.

BY *Clarence A O'Brien*
*and Harvey B. Jacobson*
Attorneys

PREFORMED ENCLOSED INSULATING FILLER AND INSULATING STRIP

CROSS REFERENCE TO RELATED PATENT

This invention relates to improvements on my prior U.S. Pat. No. 3,318,062 issued May 9, 1967.

BACKGROUND OF THE INVENTION

1. Field of the Invention

The present invention generally relates to hollow building blocks and more particularly insulating fillers or inserts for such blocks and an insulating strip associated with the inserts to provide a continuous insulating barrier or wall within a wall formed by a plurality of courses of hollow building blocks and includes improvements in my prior U.S. Pat. No. 3,318,062 which is incorporated herein by reference.

2. Description of the Prior Art

The prior art, including my prior U.S. Pat. No. 3,318,062, discloses the use of insulating inserts in hollow building blocks of the type having transverse vertical ribs spacing an inner and outer wall from each other. Such insulating fillers or inserts have included notches which receive the web of the building block. Such inserts are usually preformed and constructed of heat insulating material such as foam urethane or the like. However, such material does not have good mechanical strength characteristics, does not provide an adequate vapor barrier in some instances and the insulating characteristics were interrupted where mortar was used to interconnect the insulating inserts between courses of blocks.

SUMMARY OF THE INVENTION

The present invention has for its object the provision of an insulating filler or insert which is preformed of foam plastic and provided with an enclosure of plastic or treated paper which will serve to form the foam plastic into the desired shape and also provide a vapor barrier for the foam plastic and provide additional mechanical strength thereto for materially reducing damage to the insert during installation thereof.

Another object of the invention is to provide a compressible insulating strip for positioning around three sides of the filler insert so that the combination of the filler insert and insulating strip will provide a continuous uninterrupted insulating wall or barrier within the interior of a hollow wall formed by a plurality of courses of hollow building blocks.

DESCRIPTION OF THE PREFERRED EMBODIMENT

Figure 1:
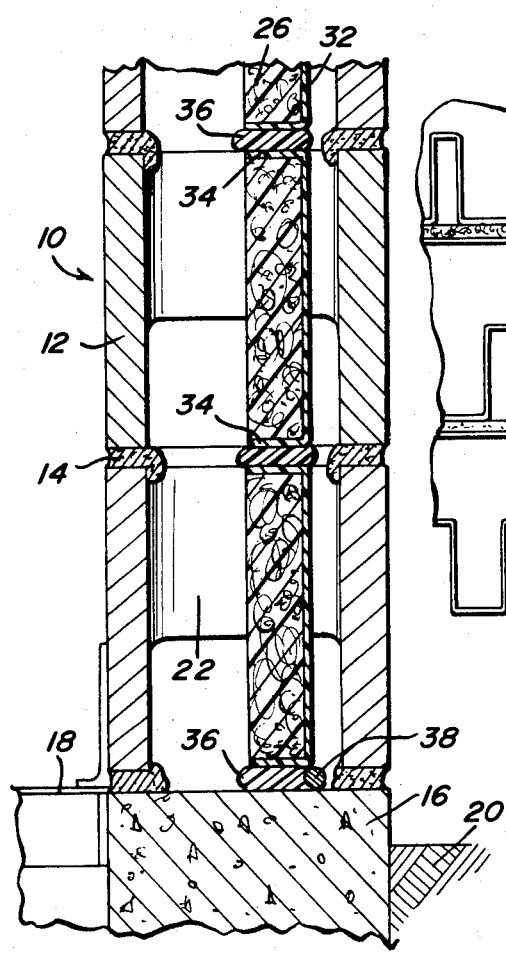
FIG. 1 is a sectional view of a hollow wall formed by a plurality of hollow building blocks with the insulating filler and insulating strip of the present invention incorporated therein.

Referring now specifically to the drawings, FIG. 1 illustrates a building wall 10 constructed of a plurality of vertically superimposed courses of hollow building blocks 12 joined together by use of a conventional mortar 14 forming a joint therebetween. The lowermost course of blocks 12 is supported on a footing 16 with an interior floor 18 connected thereto in a conventional manner and an exterior grade 20 also being provided with the wall structure being conventional with the building blocks 12 and 14 including an inner wall and an outer wall separated by vertical webs 22 which extend for approximately one-half of the height of the inner and outer walls. Thus, a regular hollow building block is provided except that the webs are depressed and are approximately one-half the height of the building block although this relationship may vary where desired. Such building blocks are provided and they include corner blocks and standard procedures may be employed in installing the blocks so that reinforcement is provided if necessary, air vents are provided if necessary. The building blocks form no particular part of the present invention except in their association with the insert or filler and insulating strip.

Figure 3:
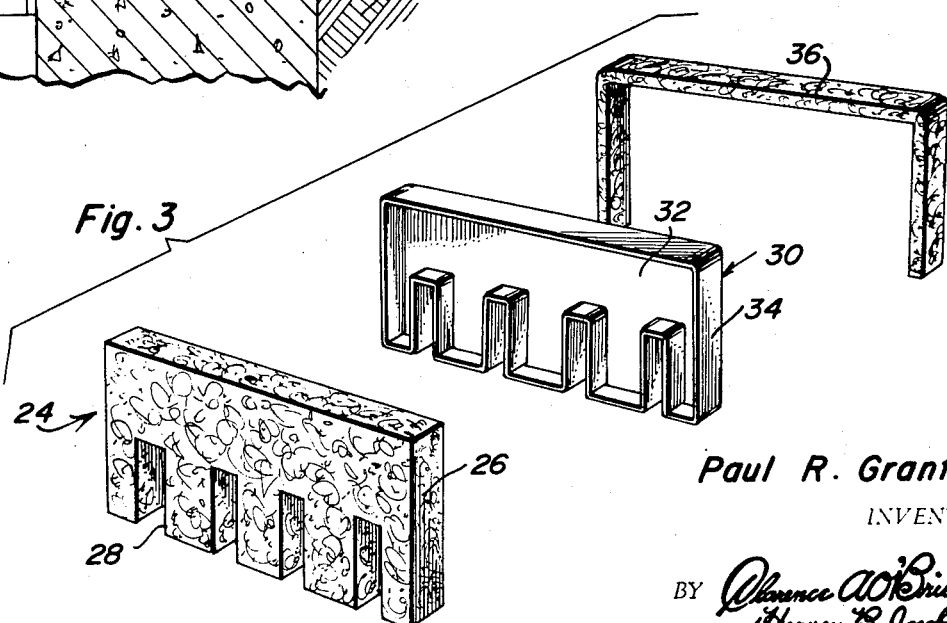
FIG. 3 is an exploded perspective view illustrating the insulating filler, the enclosure therefor and the insulating strip.

The insert or filler is generally designated by the numeral 24 and includes a body of foam plastic material 26 such as foam urethane or the like which is non-combustible and has very good insulating properties. One longitudinal edge of the generally rectangular block is provided with a plurality of notches 28 therein which are spaced apart a distance to receive the webs 22 or the blocks therebetween. As illustrated in FIG. 3, four notches 28 are provided with the notches being generally one-half of the vertical dimension of the insert 26 so that when the notches 28 receive the webs 22, the space between the webs will be filled by the material between the notches 28 and the remainder of the vertical space between the walls of the building blocks will be filled by the remainder of the insert 26 thereby providing a vertical insert of insulating material which occupies the vertical and horizontal dimensions of the block except for the space occupied by the webs. The thickness of the block 26 is substantially less than the space between the inner and outer walls of the building block as illustrated in FIG. 1.

An enclosure 30 is provided for the insulating block and includes a facing member 32 and a peripheral edge member 34 integral therewith or joined thereto which completely encloses one face of the insulating block and the periphery of the insulating block including the periphery of each of the notches 28. The enclosure may be constructed of preformed plastic sheeting or treated paper which will provide a vapor barrier for the insulating block or insert 26 and also provide additional mechanical strength thereto to prevent damage to the insert 26 during assembly thereof with the building blocks.

The enclosure 30 may be used to shape the foam plastic when it is being formed and the enclosures may be connected together by a perforated or pre-scored for separation of the inserts. This would enable a plurality of the inserts to be formed by using the enclosures 30 as a form with the enclosed inserts then being separable from each other after hardening so that they may be assembled with the building blocks 12.

Figure 2:
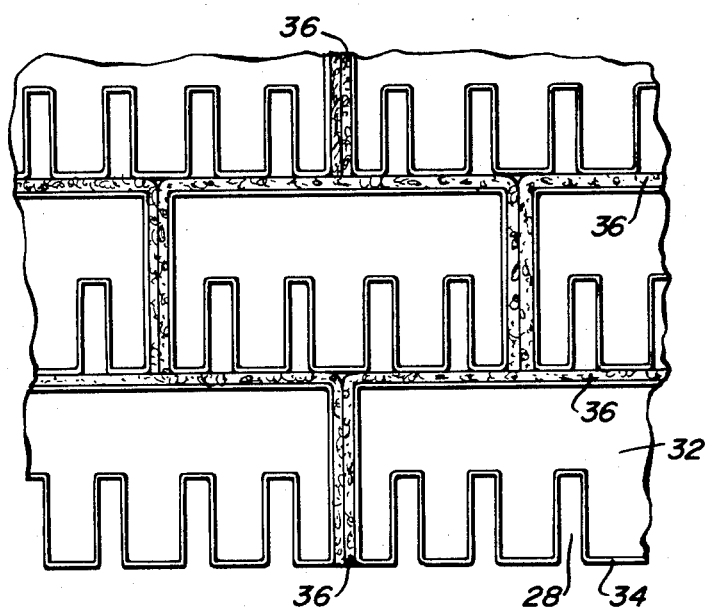
FIG. 2 is a side elevational view of an assembly of the insert fillers and insulating strips showing the continuity of the insulating barrier formed thereby when assembled.

An insulating strip 36 constructed of a compressible insulative material which is engaged with the continuous top peripheral edge and the two side peripheral edges of the enclosure 30 so that the insulative strips will compressibly engage each other where they pass along the side edges 34 and will engage the bottom edge of an overlying and staggered course of inserts 24 as illustrated in FIG. 2 so that a continuous insulating barrier will be formed by the inserts 24 and the enclosures 30 when combined with the insulating strips 36.

Where the lowermost filler or insert engages the footing 16, the insulating strip 36 may be provided with a continuous bead of mastic 38 to assure better waterproofing of the joint therebetween.

While the enclosure has been illustrated with one face thereof covering a face of the insert 26, both faces of the foam plastic block of the insert may be left open thus leaving only a peripheral enclosure for the block of foam plastic 26 which serves as an effective enclosure to prevent damage to the foam block during assembly and maintain the shape and configuration of the block.

With this construction, the objectionable characteristics of concrete blocks themselves may be readily overcome by providing the preformed and enclosed insulating inserts together with the insulating strip which may be stiffened and reinforced if desired to maintain it in position when the blocks are being laid by following conventional procedures in applying the mortar joints 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An insulating block comprising a preformed monolithic hollow masonry block having parallel vertical end edges and parallel horizontal top and bottom surfaces defined by a pair of parallel upstanding side walls connected by a plurality of upstanding, longitudinally spaced and transversely extending webs defining vertically opening recesses therebetween, said webs having a height less than the side walls and one horizontal edge aligned with a horizontal surface of the side walls thereby forming vertically opening recesses communicating with the other horizontal surface of the block thereby providing a longitudinal passage through said block in communication with one horizontal surface thereof, a one-piece elongated and generally horizontal filler insert of a heat insulating and preformed material including a longitudinal portion received in the recesses in the webs and the recesses in the block between the webs and vertical portions spaced longitudinally along said longitudinal portion and received in the recesses between the webs, said filler insert having parallel vertical end edges and parallel horizontal top and bottom surfaces in alignment with the corresponding end edges and top and bottom surfaces on the block, a vapor barrier enclosure including a continuous edge portion in contacting and covering relationship to the end edges, top and bottom horizontal surfaces of the filler insert, one horizontal portion of the edge portion being straight and the other horizontal portion of the edge portion being provided with notches conforming with and contacting the vertical spaced portions on the filler insert, said enclosure including a face portion in contacting and covering relationship to one face of the filler insert, said enclosure edge portion having a free exterior surface along the end edges and top and bottom horizontal surfaces thereof, and an insulating strip of compressible material independent of the enclosure and including an inner surface extending in covering and contacting relationship to the exterior surface of the end edge portions and the straight horizontal portion of the enclosure, said strip having free ends in alignment with the notched horizontal portion of the edge portion of the enclosure, said insulating strip having a free exterior surface positioned outwardly of the vertical end edges and said top surface of the block for contact with adjacent insulating strips to provide a peripherally continuous insulating strip around the enclosure when installed in a building wall, said enclosure being constructed of shape sustaining material for receiving flowable insulating material and shaping the insulating material and becoming adhered to the insulating material when the flowable insulating material hardens while in the enclosure thereby forming the filler insert and enclosure into an integrated structure.

* * * * *